US00RE45585E

(19) United States
(12) Reissued Patent
Peddicord

(10) Patent Number: US RE45,585 E
(45) Date of Reissued Patent: Jun. 30, 2015

(54) STIMULATION DEVICE

(71) Applicant: INCONTROL MEDICAL, LLC, Brookfield, WI (US)

(72) Inventor: Herschel Peddicord, Longboat Key, FL (US)

(73) Assignee: INCONTROL MEDICAL, LLC, Brookfield, WI (US)

(21) Appl. No.: 29/484,554

(22) Filed: Mar. 11, 2014

Related U.S. Patent Documents

Reissue of:

(64) Patent No.: Des. 674,503
Issued: Jan. 15, 2013
Appl. No.: 29/426,577
Filed: Jul. 6, 2012

U.S. Applications:

(60) Division of application No. 29/394,434, filed on Jun. 16, 2011, now Pat. No. Des. 670,398, which is a continuation-in-part of application No. 29/382,734, filed on Jan. 6, 2011, now Pat. No. Des. 652,526.

(51) LOC (10) Cl. ..... 28-03

(52) U.S. Cl.
USPC ..... D24/215

(58) Field of Classification Search
USPC ..... D24/211–215, 141; 601/47, 48, 63, 80, 601/81, 137, DIG. 16, DIG. 12
See application file for complete search history.

(56) References Cited

U.S. PATENT DOCUMENTS 3,403,684 A 10/1968 Steibel et al.
3,800,800 A 4/1974 Garbe et al.

(Continued)

OTHER PUBLICATIONS

Notice of Allowance for U.S. Appl. No. 29/382,734, mailed on Sep. 13, 2011, 10 pages.
Notice of Allowance for U.S. Appl. No. 29/394,433, mailed on Jun. 7, 2012, 13 pages.
Notice of Allowance for U.S. Appl. No. 29/394,434, mailed on Jun. 7, 2012, 13 pages.
Notice of Allowance for U.S. Appl. No. 29/414,097, mailed on Jun. 7, 2012, 13 pages.

*Primary Examiner* — Phillip S Hyder
(74) *Attorney, Agent, or Firm* — Foley & Lardner LLP

(57) CLAIM

I claim the ornamental design for a stimulation device, as shown and described.

DESCRIPTION

Figure 1:
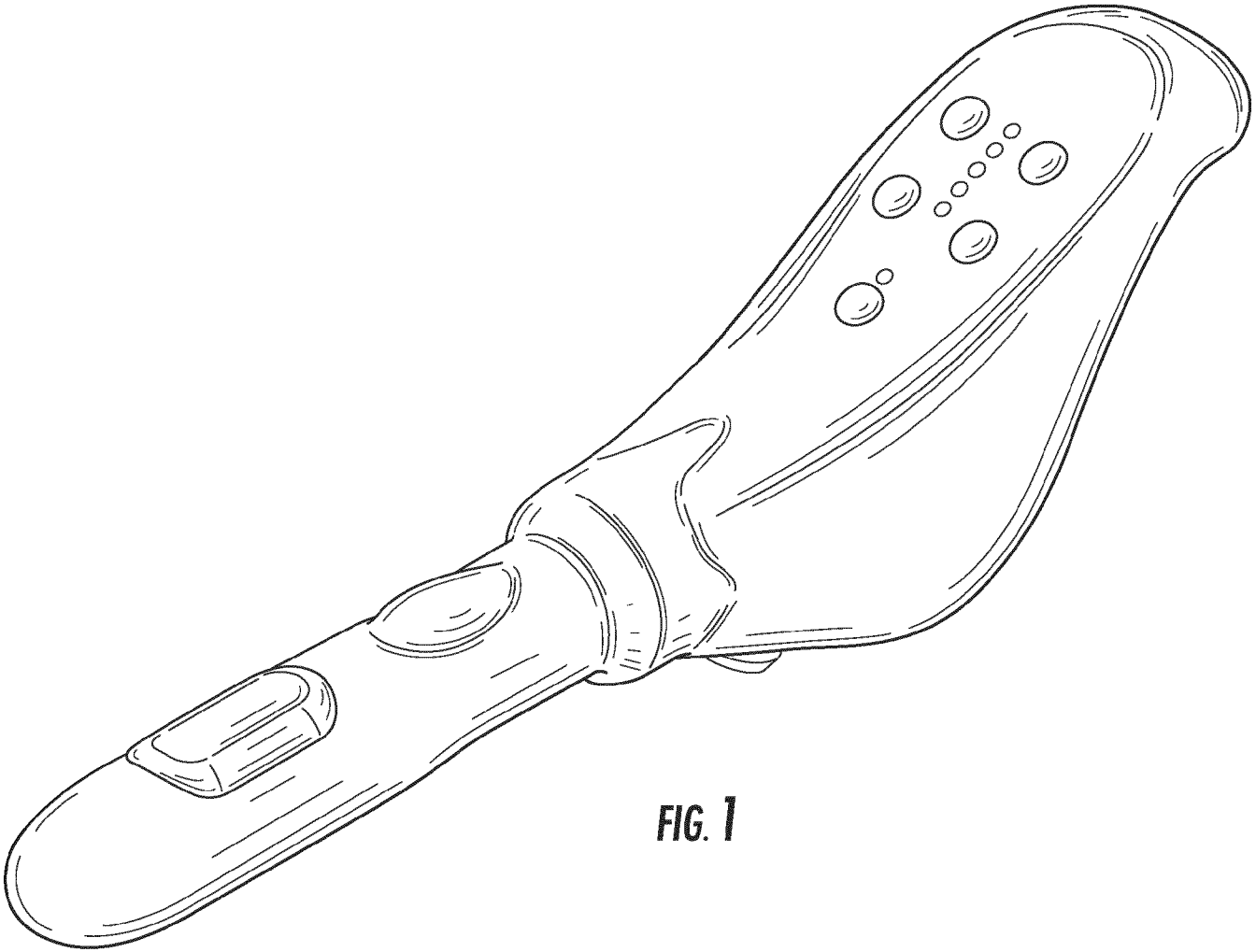
Figure 2:
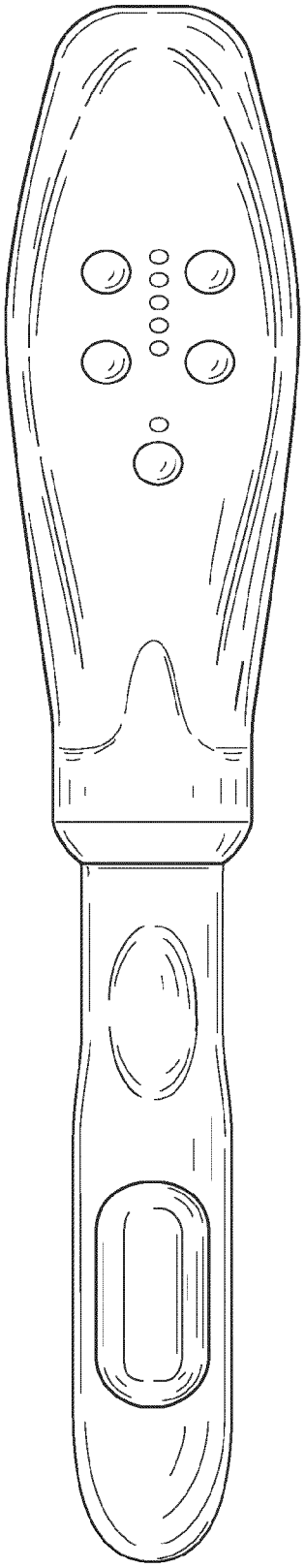
Figure 3:
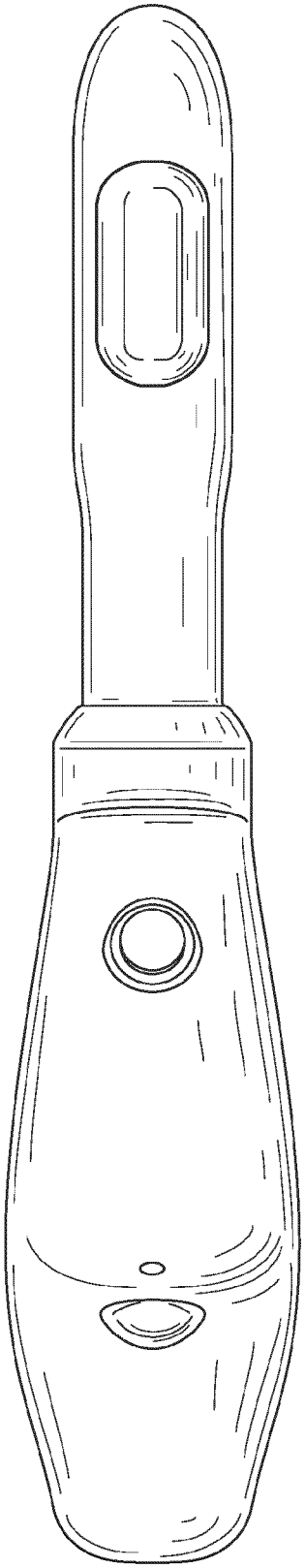
Figure 4:
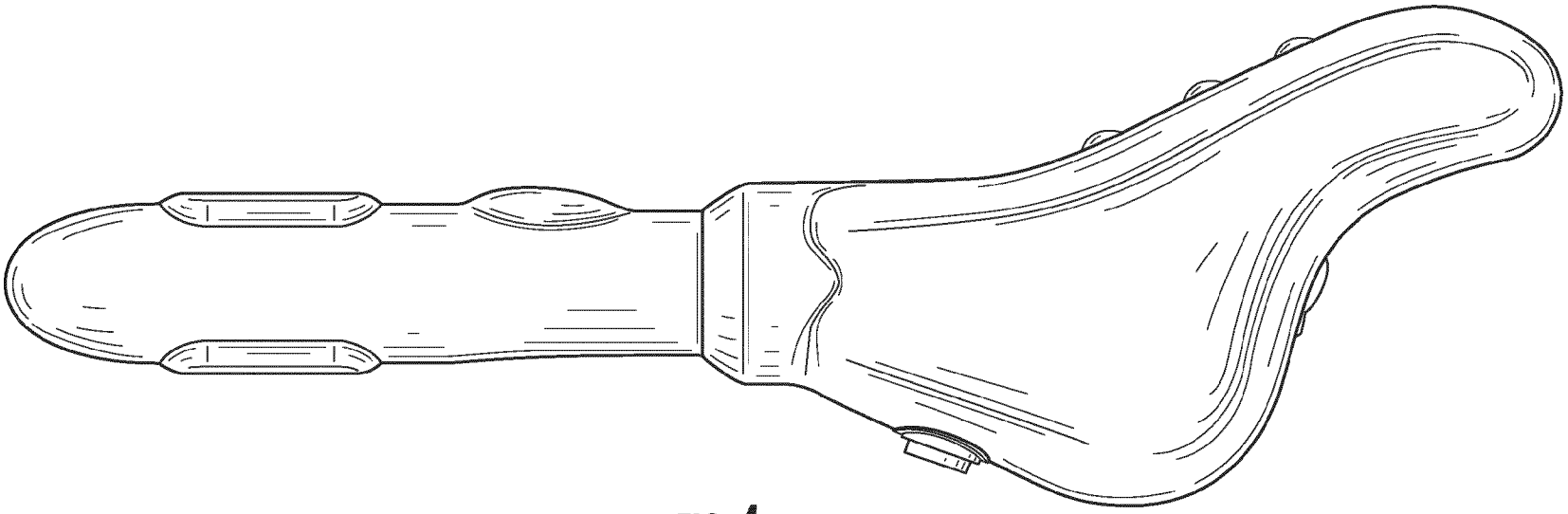
Figure 5:
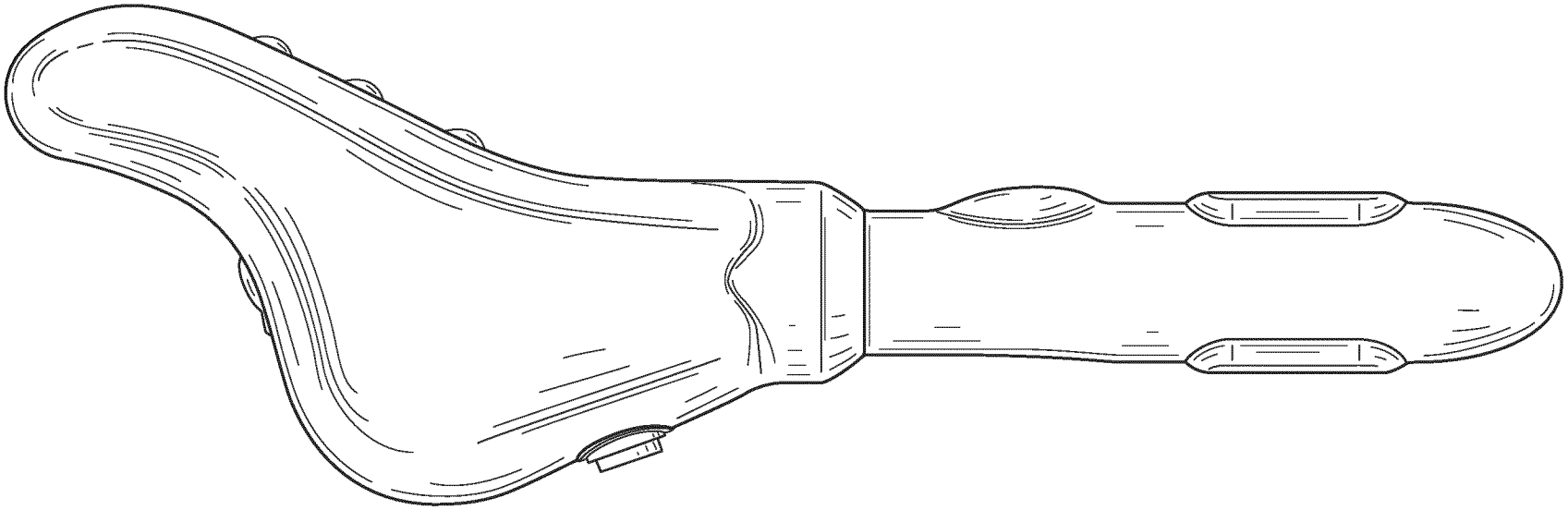
Figure 6:
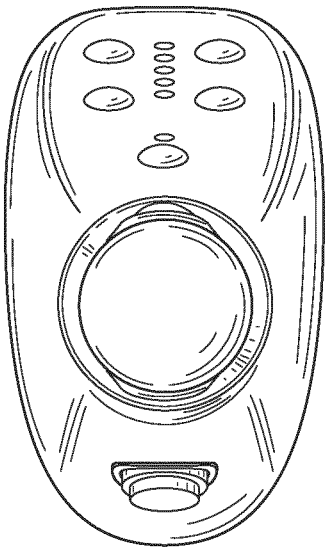
Figure 8:
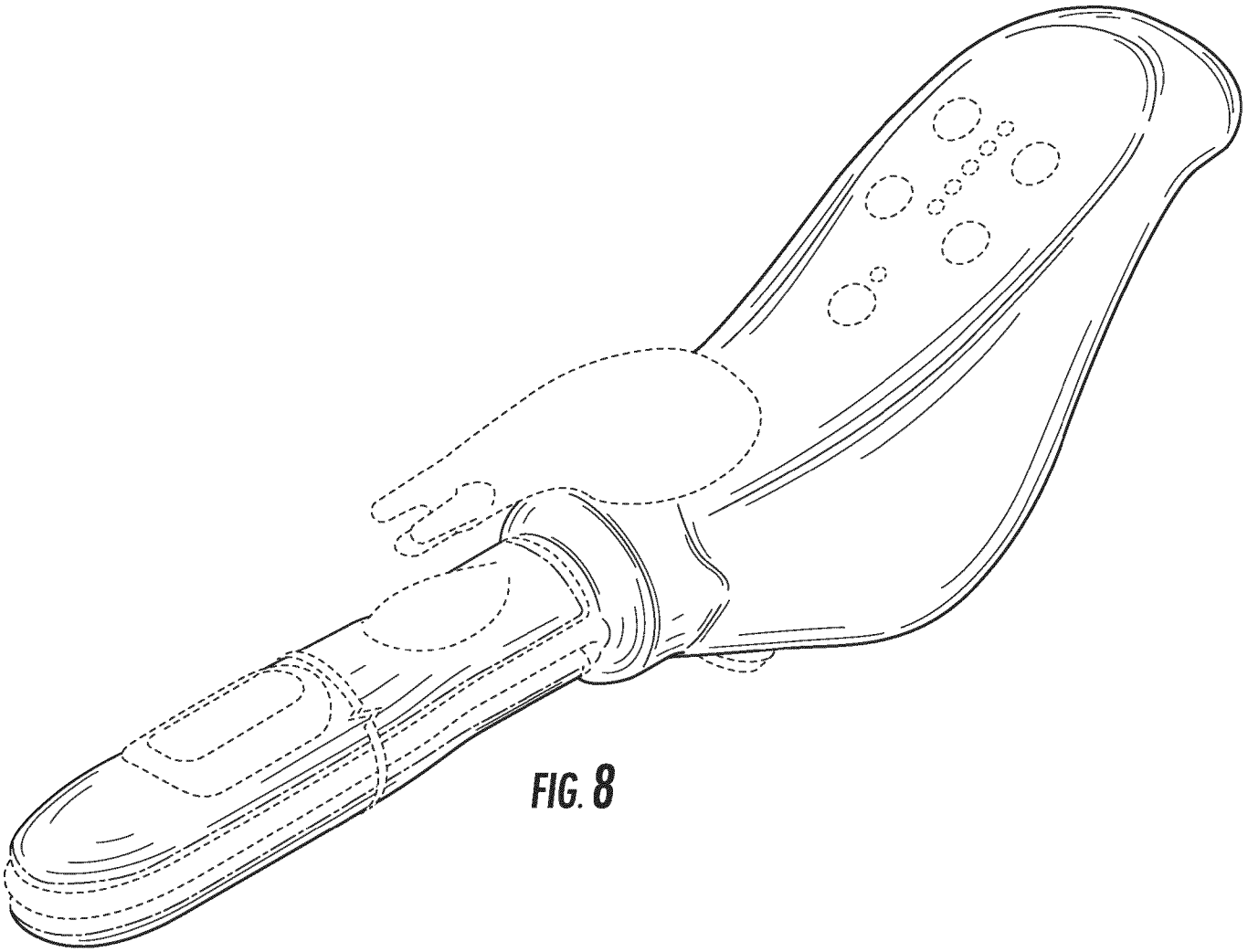
Figure 9:
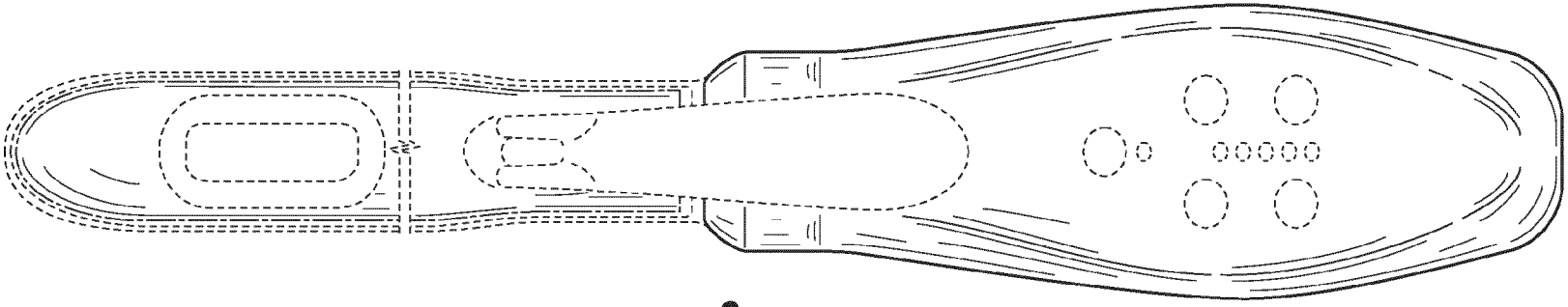
Figure 10:
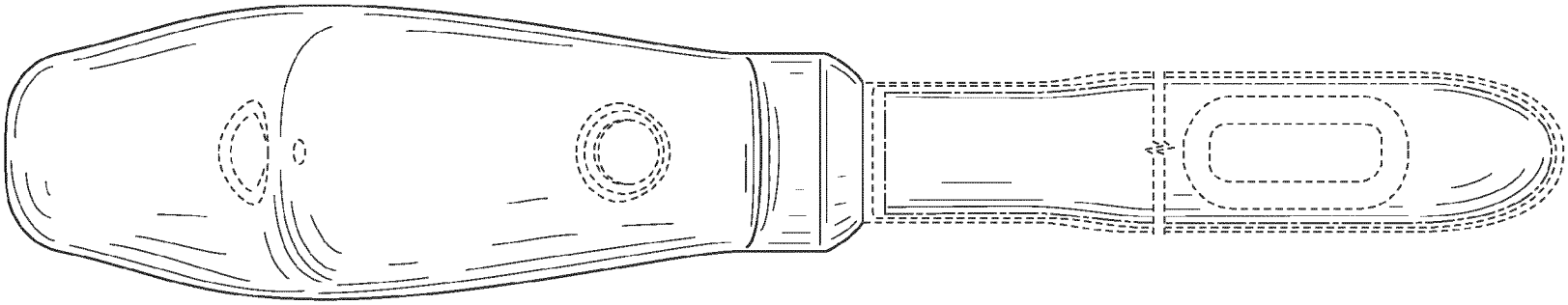
Figure 12:
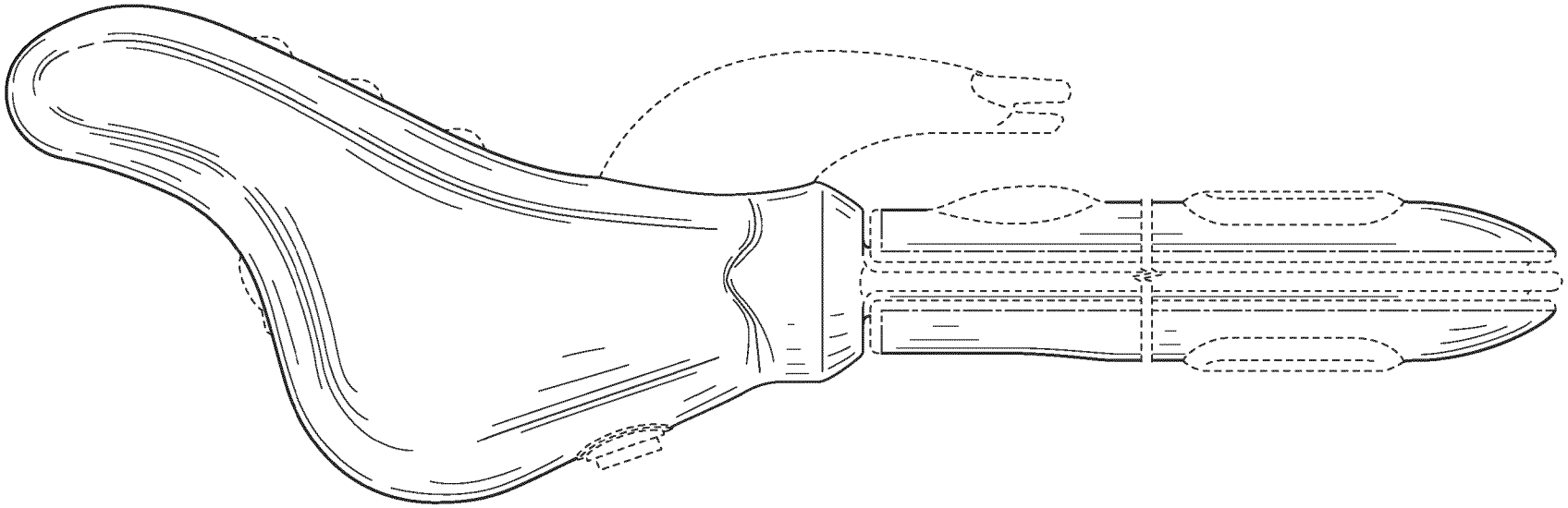
Figure 13:
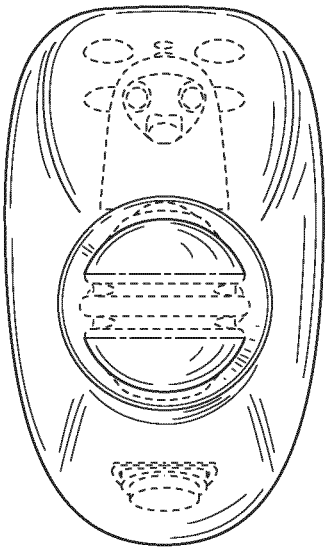

FIG. 1 is a perspective view of an embodiment of the claimed design;
FIG. 2 is a top view of the claimed design of FIG. 1;
FIG. 3 is a bottom view of the claimed design of FIG. 1;
FIG. 4 is a right side view of the claimed design of FIG. 1;
FIG. 5 is a left side view of the claimed design of FIG. 1;
FIG. 6 is a front view of the claimed design of FIG. 1;
FIG. 7 is a rear view of the claimed design of FIG. 1;
FIG. 8 is a perspective view of an embodiment of the claimed design;
FIG. 9 is a top view of the claimed design of FIG. 8;
FIG. 10 is a bottom view of the claimed design of FIG. 8;
FIG. 11 is a right side view of the claimed design of FIG. 8;
FIG. 12 is a left side view of the claimed design of FIG. 8;
FIG. 13 is a front view of the claimed design of FIG. 8; and,
FIG. 14 is a rear view of the claimed design of FIG. 8.

The ornamental design which is claimed is shown in solid lines in the drawings. The broken lines in the drawings are for illustrative purposes only and form no part of the claimed design. *Broken lines formed by equal length dashes show unclaimed portions of the design. Lines having a jagged element (i.e., broken away symbols) are not part of the claimed design and show that no particular length of the portion is claimed.*

1 Claim, 10 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| D320,087 | S | | 9/1991 | Sholzberg et al. |
| 5,199,443 | A | | 4/1993 | Maurer et al. |
| 5,314,465 | A | | 5/1994 | Maurer et al. |
| 5,370,671 | A | | 12/1994 | Maurer et al. |
| 5,376,064 | A | | 12/1994 | Cerny |
| 5,385,577 | A | | 1/1995 | Maurer et al. |
| D384,156 | S | * | 9/1997 | Kain ..... D24/200 |
| 5,662,699 | A | | 9/1997 | Hamedi et al. |
| 5,800,501 | A | | 9/1998 | Sherlock |
| 5,875,778 | A | | 3/1999 | Vroegop |
| 5,881,731 | A | | 3/1999 | Remes |
| 6,190,307 | B1 | | 2/2001 | Tsai |
| 6,289,894 | B1 | | 9/2001 | Remes |
| 6,625,495 | B1 | | 9/2003 | Alon et al. |
| 6,741,895 | B1 | | 5/2004 | Gafni et al. |
| 6,905,471 | B2 | | 6/2005 | Leivseth et al. |
| D536,097 | S | | 1/2007 | Nan |
| D536,797 | S | | 2/2007 | Klearman et al. |
| D546,964 | S | | 7/2007 | Wu |
| D555,798 | S | | 11/2007 | Nan |
| D555,799 | S | | 11/2007 | Nan |
| D558,356 | S | | 12/2007 | Nan |
| 7,341,566 | B2 | | 3/2008 | Nan |
| D579,573 | S | | 10/2008 | Nan |
| 7,438,681 | B2 | | 10/2008 | Kobashikawa et al. |
| D585,560 | S | | 1/2009 | Wu |
| D592,758 | S | | 5/2009 | Kain |
| 7,534,203 | B2 | | 5/2009 | Gil |
| 7,577,476 | B2 | | 8/2009 | Hochman et al. |
| D603,523 | S | | 11/2009 | Nan et al. |
| D606,206 | S | | 12/2009 | Nan et al. |
| D606,207 | S | | 12/2009 | Nan et al. |
| D606,208 | S | | 12/2009 | Nan et al. |
| D615,663 | S | | 5/2010 | Nan |
| D643,128 | S | * | 8/2011 | Mohamed et al. ..... D24/215 |
| D648,442 | S | * | 11/2011 | Caggiano et al. ..... D24/215 |
| D653,350 | S | | 1/2012 | Chen |
| 8,509,900 | B2 | | 8/2013 | Boyd et al. |
| 2004/0054392 | A1 | | 3/2004 | Dijkman |
| 2007/0149903 | A1 | | 6/2007 | Nan |
| 2008/0009775 | A1 | | 1/2008 | Murison |
| 2008/0119767 | A1 | | 5/2008 | Berry et al. |
| 2009/0005714 | A1 | | 1/2009 | Mecenero |
| 2009/0171144 | A1 | | 7/2009 | Squicciarini |
| 2009/0228064 | A1 | | 9/2009 | Boyd et al. |
| 2009/0270963 | A1 | | 10/2009 | Pelger et al. |
| 2009/0275796 | A1 | | 11/2009 | Gil |
| 2010/0004707 | A1 | | 1/2010 | Hochman et al. |
| 2010/0041944 | A1 | | 2/2010 | Levy |
| 2010/0087703 | A1 | | 4/2010 | Gabrielidis |
| 2010/0106216 | A1 | | 4/2010 | Cha et al. |
| 2010/0174136 | A1 | | 7/2010 | Shim |
| 2010/0174137 | A1 | | 7/2010 | Shim |
| 2011/0034834 | A1 | | 2/2011 | Lapi |
| 2011/0034837 | A1 | | 2/2011 | Lee |
| 2011/0105837 | A1 | | 5/2011 | Lee ..... 600/38 |
| 2011/0230802 | A1 | | 9/2011 | Nan |
| 2014/0200646 | A1 | | 7/2014 | Boyd et al. |

* cited by examiner

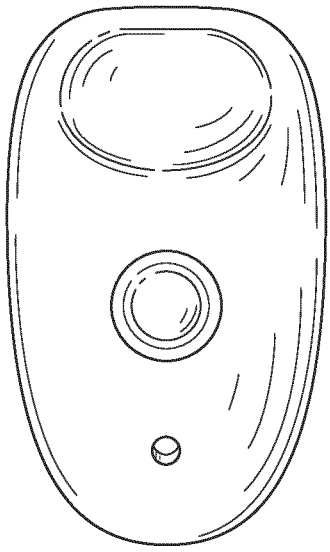
FIG. 7
AMENDED

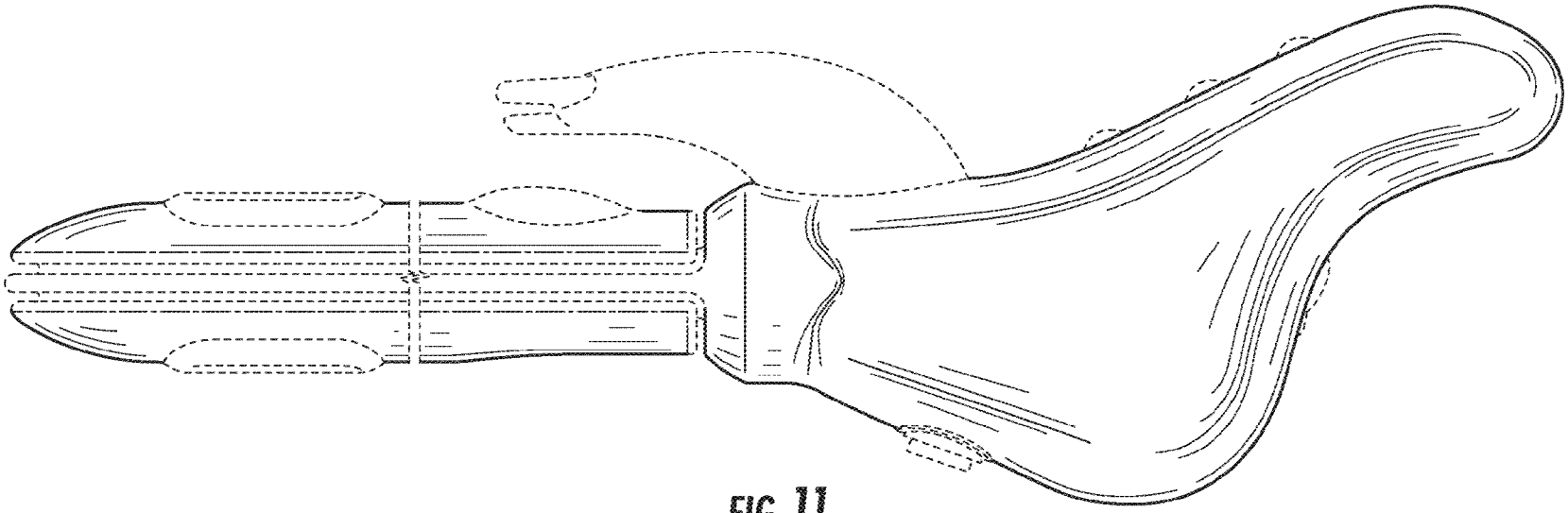
FIG. 11
AMENDED

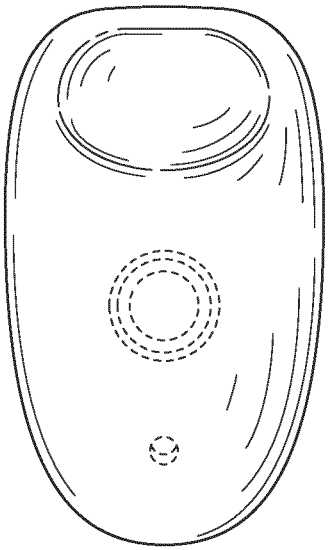
FIG. 14
AMENDED